(12) United States Patent
Dorbie et al.

(10) Patent No.: US 7,652,677 B2
(45) Date of Patent: Jan. 26, 2010

(54) GRAPHICS SYSTEM EMPLOYING PIXEL MASK

(75) Inventors: Angus M. Dorbie, San Diego, CA (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 11/499,200

(22) Filed: Aug. 3, 2006

(65) Prior Publication Data

US 2008/0030522 A1 Feb. 7, 2008

(51) Int. Cl.
*G09G 5/00* (2006.01)
(52) U.S. Cl. ............... 345/614; 345/626; 345/619; 345/611; 345/612
(58) Field of Classification Search .......... 345/626, 345/627
See application file for complete search history.

(56) References Cited

U.S. PATENT DOCUMENTS

| | | | | |
|---|---|---|---|---|
| 5,321,770 A * | 6/1994 | Huttenlocher et al. | ....... | 382/174 |
| 5,613,052 A * | 3/1997 | Narayanaswami | .......... | 345/627 |
| 6,404,936 B1 * | 6/2002 | Katayama et al. | ........... | 382/283 |
| 6,731,300 B2 | 5/2004 | Tang et al. | | |
| 6,768,491 B2 * | 7/2004 | Lefebvre et al. | ............ | 345/581 |
| 6,819,332 B2 * | 11/2004 | Baldwin | ..................... | 345/611 |
| 7,006,110 B2 * | 2/2006 | Crisu et al. | ................. | 345/626 |
| 7,280,119 B2 | 10/2007 | Leather et al. | | |
| 7,456,846 B1 * | 11/2008 | King et al. | ................... | 345/613 |
| 2002/0097241 A1 * | 7/2002 | McCormack et al. | ....... | 345/423 |
| 2004/0207642 A1 * | 10/2004 | Crisu et al. | ................. | 345/626 |

OTHER PUBLICATIONS

International Search Report, PCT/US07/075135, International Search Authority, European Patent Office, Nov. 18, 2008.
Written Opinion, PCT/US07/075135, International Search Authority, European Patent Office, Nov. 18, 2008.
Capens, "Advanced Rasterization," DEVMASTER.NET Forum Post, Nov. 9, 2004, Internet Reference, XP002503146.

(Continued)

*Primary Examiner*—M Good Johnson
(74) *Attorney, Agent, or Firm*—George C. Pappas; Michael J. Dehaemer, Jr.

(57) ABSTRACT

The system includes a bounds primitive rasterizer that rasterizes a bounds primitive into a selection of primitive pixels. The selection of primitive pixels bounds a shape to be rendered to a screen. The system also includes a pixel mask generator that generates a pixel mask for the shape. The pixel mask includes mask pixels that each corresponds to one of the primitive pixels. A mask pixel is a covered pixel when the shape covers at least a threshold portion of the mask pixel and is an uncovered pixel when the shape does not cover the mask pixel. The system also includes a pixel screener configured to retain primitive pixels that correspond to covered mask pixels and to discard primitive pixels that correspond to uncovered mask pixels.

28 Claims, 5 Drawing Sheets

OTHER PUBLICATIONS

Green, "Hierchical Polygon Tiling with Coverage Masks," Association for Computing Machinery, Computer Graphics Proceedings 1996 (Siggraph), New Orleans, Aug. 4, 1996, pp. 65-74, Siggraph, New York, NY, USA, XP000682722.

Rueda et al., "Rasterizing complex polygons without tessellations," Graphical Models, May, 2004, pp. 127-132, vol. 66, No. 3, Elsevier, San Diego, CA, USA, XP001244485.

Ackermann, "Single Chip Hardware Support for Rasterizetion and Texture Mapping," Computers and Graphics, Jul. 1996, pp. 503-514, vol. 20, No. 4, Elsevier, GB, XP004025144.

International Search Report, PCT/US07/079591, International Search Authority, European Patent Office, May 7, 2008.

Written Opinion, PCT/US07/079591, International Search Authority, European Patent Office, May 7, 2008.

* cited by examiner

GRAPHICS SYSTEM EMPLOYING PIXEL MASK

BACKGROUND

1. Field

The present invention relates generally to graphics systems for rendering images and more particularly to graphics software interfaces.

2. Background

Graphics systems often rasterize different shapes into pixels. During rasterization, the graphics system identify which pixels fall within the shape. The process of identifying the pixels that fall within the shape becomes more difficult as the shape becomes more complex. Features that can contribute to the complexity of a shape include smooth curves, concave geometry, self-intersection, and holes. Graphics systems can deal with these complex shapes by converting the shape into multiple simpler shapes or by directly rasterizing the complex shapes. These solutions are inefficient and can be difficult to implement in hardware. For these reasons, there is a need for an improved graphics system.

SUMMARY

A graphics system is configured to retain a pixel in a rasterized bounds primitive when a corresponding pixel from a pixel mask is a covered pixel. The system is also configured to discard the pixel when the corresponding pixel is an uncovered pixel. The corresponding pixel is a covered pixel when a shape bounded by the bounds primitive covers at least a threshold portion of the corresponding pixel. The corresponding pixel is an uncovered pixel when the shape does not cover the corresponding pixel.

An embodiment of the system includes a bounds primitive rasterizer that rasterizes a bounds primitive into a selection of primitive pixels. The selection of primitive pixels bounds a shape to be rendered to a screen. The system also includes a pixel mask generator that generates a pixel mask for the shape. The pixel mask includes mask pixels that each corresponds to one of the primitive pixels. A mask pixel is a covered pixel when the shape covers at least a threshold portion of the mask pixel and is an uncovered pixel when the shape covers less than the threshold portion of the mask pixel. The system also includes a pixel screener configured to retain primitive pixels that correspond to covered mask pixels and to discard primitive pixels that correspond to uncovered mask pixels. The system also includes a pixel attribute generator that generates pixel attributes for the retained pixels and refrains from generating pixel attributes for the discarded pixels.

DETAILED DESCRIPTION

The graphics system is configured to rasterize a shape into a pixel mask. The pixel mask has a plurality of mask pixels that each corresponds to a pixel on a display screen. Each mask pixel is a covered pixel or an uncovered pixel. A mask pixel is a covered pixel when the shape covers at least a threshold portion of the mask pixel and is an uncovered pixel when the shape does not cover the mask pixel. The graphics system is also configured to rasterize a bounds primitive into a selection of primitive pixels that bound the shape. Each primitive pixel corresponds to a pixel on the display screen and accordingly to a mask pixel. The system retains primitive pixels that correspond to covered mask pixels and to discard primitive pixels that correspond to uncovered mask pixels. The system can generate pixel attributes for the retained pixels and refrain from generating pixel attributes for the discarded pixels.

The graphics system can employ software and/or firmware to generate the pixel mask while employing hardware to rasterize the bounds primitive and screen the primitive pixels. Software and/or firmware are better suited for identifying pixels that fall within complex shapes than hardware. As a result, employing software and/or firmware to generate the pixel mask employs a more efficient resource to identify pixels that fall within a shape and frees up the hardware for other applications. Accordingly, employing software and/or firmware to generate the pixel mask provides a more efficient graphics system.

Figure 1:
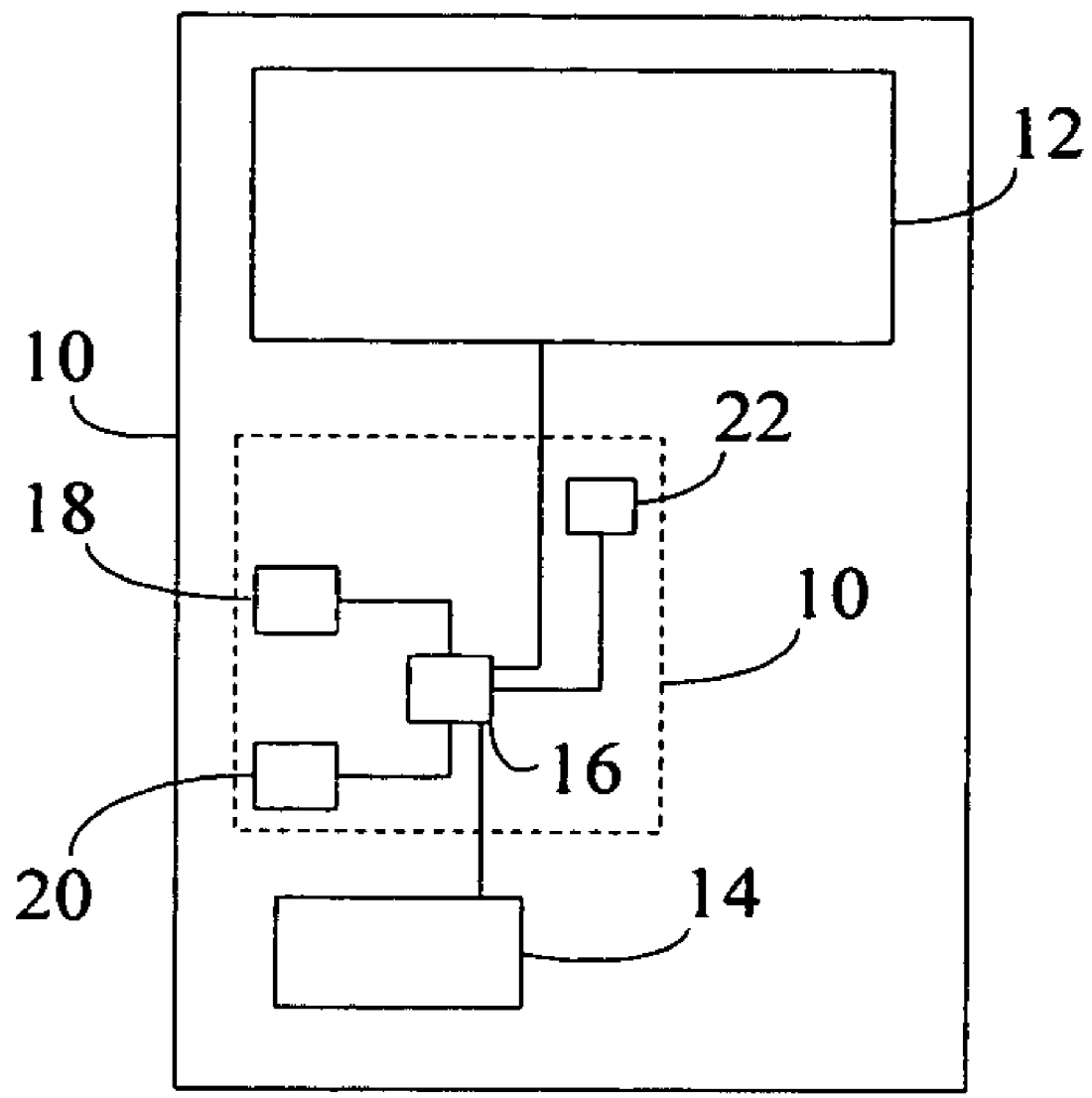
FIG. 1 is a box diagram of a graphics system.

FIG. 1 illustrates a graphics system that includes electronics 10 in communication with a display screen 12. The electronics 10 are configured to render an image on the display 12. Suitable displays 12 include, but are not limited to, liquid crystal displays (LCDs), and cathode ray tube (CRT) displays.

The electronics 10 are also in communication with one or more user interfaces 14. Suitable user interfaces 14 include, but are not limited to, buttons, knobs, keys, keypads, keyboards, and a mouse. A user of the graphic system can employ the one or more user interfaces to provide commands to the electronics 10. The electronics 10 can execute the commands and display the results of the command on the display 12. Examples of commands include a change in the viewpoint from which the image is viewed. Accordingly, the electronics 10 can change the image on the display as required by the change in viewpoint. In executing commands, the electronics 10 can operate the system completely or partially in accordance with software interfaces including, but not limited to, Open Graphics Library (OpenGL), OpenGLES, and Direct3D, etc. OpenGL is described in a document entitled "The OpenGL® Graphics System: A Specification," Version 2.0, dated Oct. 22, 2004.

The electronics 10 include a controller 16. A suitable controller 16 includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics 10 and/or the controller 16. A general purpose processor may be a microprocessor, but in the alternative, the controller 16 may include or consist of any conventional processor, microcontroller, or state machine. A controller 16 may also be implemented as a combination of computing devices, e.g., a combination of a DSP and a microprocessor, a plurality of microprocessors, one or more microprocessors in conjunction with a DSP core, or any other such configuration.

The electronics 10 include a memory 18 in communication with the controller 16. The electronics 10 can store data for the image and data for rendering the image in the memory 18. The memory 18 can be any memory device or combination of memory devices suitable for read/write operations.

In some instances, the electronics 10 include a computer-readable medium 20 in communication with the controller 16. The computer-readable medium 20 can have a set of instructions to be executed by the controller 16. The controller 16 can read and execute instructions included on the computer-readable medium. The controller executes the instructions such that the electronics 10 perform desired functions such as executing a command provided by the user. Although the computer-readable medium 20 is shown as being different from the memory 18, the computer-readable medium 20 can be the same as the memory 18. Suitable computer-readable media include, but are not limited to, optical discs such as CDs, magnetic storage diskettes, Zip disks, magnetic tapes, RAMs, and ROMs.

As will be described in more detail below, some functions of the electronics may be executed using hardware while other functions are executed using firmware and/or software. When the electronics implement a function using firmware and/or software, the electronics employ a processor to execute instructions on a computer-readable medium. For instance, the electronics can employ a processor reading software written on a RAM implement a function. In contrast, when the electronics implement a function in hardware, the hardware does not execute instructions on the computer-readable medium.

In some instances, the graphics system is configured to communicate wirelessly with a network. Accordingly, the controller 16 can optional be in communication with a transceiver 22. The controller 16 can employ the transceiver to send and/or receive messages to a network. As an alternative to the transceiver, the electronics 10 can be in communication with a receiver and a transmitter. When the graphics system is configured to communicate wirelessly with a network, the electronics 10 can operate in accordance with a wireless communications standard such as Code Division Multiple Access (CDMA), Time Division Multiple Access, such as Global System for Mobile Communications (GSM), or some other wireless communication standard.

Suitable graphic systems include, but are not limited to, cellular phones, access terminals, handsets, personal digital assistants (PDA), laptop computers, video game units, and personal computers. Although FIG. 1 illustrates the electronics 10, the display 12, and the one or more user interfaces positioned integrated into a single device in a case, the electronics 10, the display 12, and/or the one or more user interfaces can be included in different devices and/or can be located remotely from one another. Additionally or alternately, different components of the electronics 10 can be included in different devices.

Figure 2:
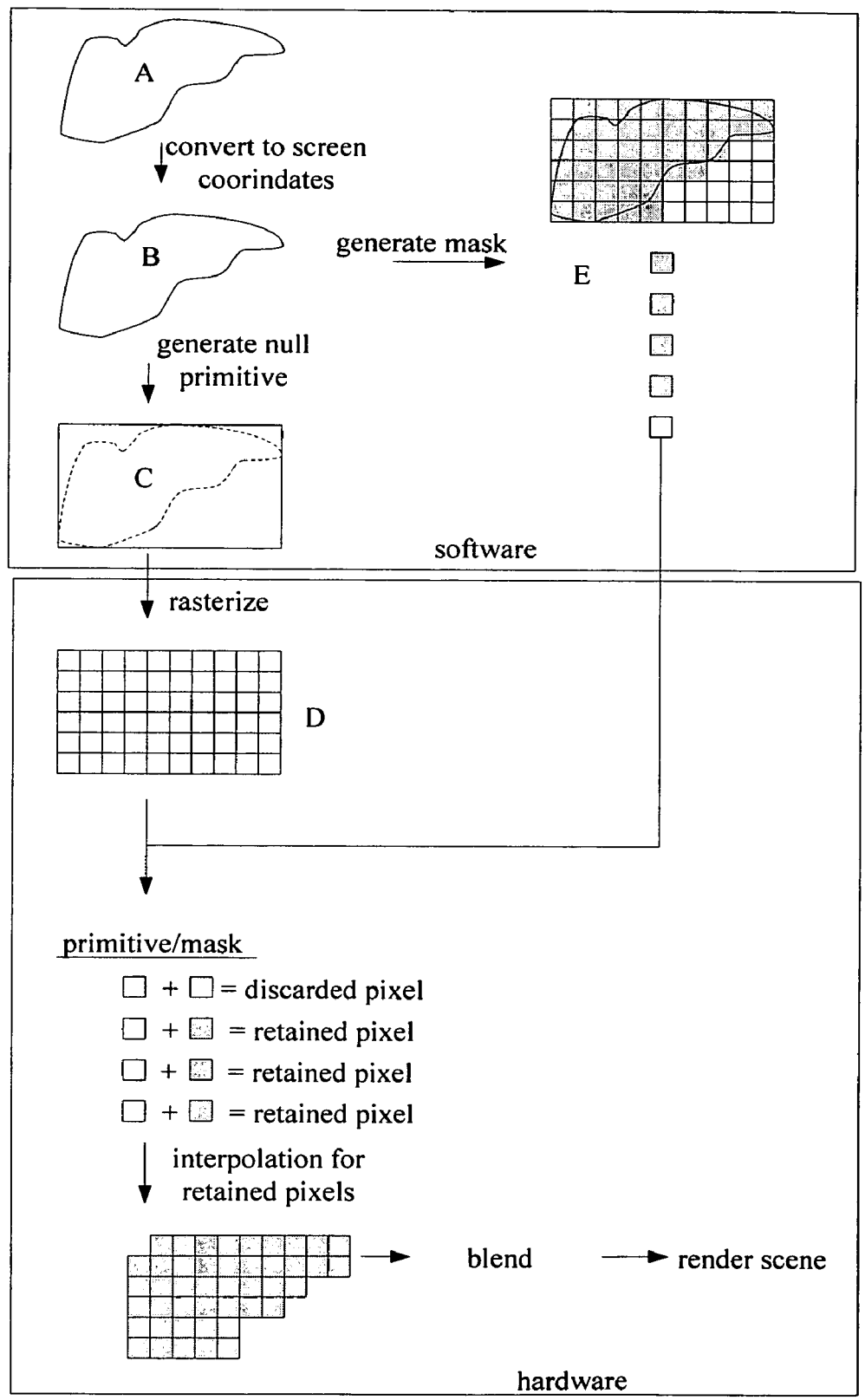
FIG. 2 illustrates progression of data through a graphic system.

FIG. 2 illustrates progression of data through the graphics system. The memory contains a shape description for a shape to be displayed on the display screen. The diagram labeled A illustrates the described shape. The shape description can be in two or more dimensions. For instance, the shape description can be three-dimensional. Suitable shape descriptions can include one or more mathematical equations. For instance, the mathematical equation for a circle or a sphere are well-known. The complexity of the shape can be increased by adding mathematical equations, subtracting mathematical equations, and/or performing other operations on mathematical equations. The shape description can be made using methods other than or in addition to mathematical equations. Accordingly, the shape description can exclude mathematical equations.

The texture type can be the same across the shape. For instance, the entire shape can be covered with a particular type of texture. Examples of texture include, but are not limited to, wood textures, brick textures, and stone textures.

In some instances, the graphics system converts the shape description to screen coordinates. Accordingly, the diagram labeled B in FIG. 2 illustrates the screen shape in screen coordinates. The transformation to screen coordinates can include one or more transformations. For instance, when the shape description is in three dimensions, the graphics system can transform the object shape description to world coordinates, from the world coordinates to eye coordinates, from eye coordinates to homogeneous perspective eye coordinates, from this representation through homogeneous divide to screen coordinates, and finally from the screen coordinates a viewport transformation maps these coordinates to device specific coordinates which are directly mapped to some in-memory layout. The transformation from the shape description to the world coordinates can effectively place all shapes in a common world. The eye coordinates are the coordinates of the 3D objects relative to a computed view point. Typically, the transformation of the shape to world coordinates and then to eye coordinates is performed as a single transformation that can be done through a single modelview matrix transformation. The transformation from the eye coordinate system to the homogeneous eye coordinate system causes objects that are further from the viewpoint to appear smaller than closer objects after the homogeneous divide. The transformation from eye coordinates to screen coordinates can generally be done through a projection matrix and the homogeneous divide can be implicit and can be designed into the hardware. The screen coordinate system is nominally a 2D system after a homogeneous normalization is performed although some 3D information may be retained for hidden surface and perspective correct interpolation calculations. The device coordinates represent a direct mapping of the image that is to be rendered on the screen. In some instance, the device coordinates can serve as the screen coordinates and/or the screen coordinates serve as the device coordinates. When the shape description is in two-dimensions, one or more of the above transformations may not be required. For instance, the transformation into eye coordinates and perspective eye coordinates may not be required when the shape description is two-dimensional.

The electronics use the screen coordinates to generate a bounds primitive that bounds the screen shape. For the purposes of illustration, the diagram labeled C illustrates the shape illustrated by dashed lines and the perimeter of the bounds primitive with solid lines. The solid lines bound the shape in screen coordinates. The bounds primitive can have a shape commonly employed by primitives. For instance, the bounds primitive can be a polygon such as a triangle, square or rectangle. The bounds primitive can defined by data associated with each vertex of the primitive. Each vertex can be associated with data for various attributes such as position, color values and texture coordinates. Color attributes are generally specified by a red value, a green value, and a blue value (r, g, b). Texture coordinates are generally specified by horizontal and vertical coordinates (s and t) on a texture map. In screen coordinates, position attributes are generally specified as a horizontal coordinate and a vertical coordinate (x, y) but can also optionally include a depth coordinate (z) for use in hidden surface removal.

The electronics rasterize the bounds primitive into primitive pixels. The diagram labeled D in FIG. 2 illustrates the screen shape rasterized into primitive pixels. Accordingly, diagram D represents the primitive rasterization. Each primitive pixel corresponds to a pixel on the screen.

The electronics also use the screen shape to generate a pixel mask. The electronics generate the pixel mask by rasterizing the screen shape into mask pixels such that each mask pixel is divided into one or more pixel regions. For the purposes of illustration, the diagram labeled E in FIG. 2 illustrates the screen shape rasterized into mask pixels such that each mask pixel includes a single pixel region. As a result, the mask pixels and the pixel regions are the same.

The mask pixels correspond to a pixel on the screen. Accordingly, at least a portion of the mask pixels each correspond to a primitive pixel and at least a portion of the primitive pixels are each associated with one or more pixel regions from the pixel mask. In some instances, each of the primitive pixels are each associated with one or more pixel regions from the pixel mask. In some instances, each of the mask pixels each correspond to a primitive pixel and each of the primitive pixels corresponds to a mask pixel.

The electronics can employ one or more coverage criteria to generate regional coverage data that indicates whether each pixel region is a covered region or an uncovered region. An example of a suitable coverage criterion is whether any portion of the screen shape falls within a pixel region. For instance, a pixel region can be a covered region when a portion of the screen shape falls inside of the pixel region and a pixel region can be an uncovered region when the screen shape falls entirely outside of the pixel region. The example coverage criterion was applied to diagram E on FIG. 2. The uncovered regions are shown as white while the covered regions are shown as gray. Accordingly, the pixel mask includes covered regions and uncovered regions.

Other test criteria can be employed. For instance, the test criteria can employ a coverage threshold percentage. A pixel region will be a covered region if the screen shape covers more than the threshold percentage of the pixel region and a pixel region will be an uncovered region if the screen shape covers less than the threshold percentage of the pixel region.

The electronics can employ one or more secondary coverage criteria to generate pixel coverage data which indicates whether a mask pixel is a covered pixel or an uncovered pixel. For instance, the electronics can classify a mask pixel as a covered pixel when the number of pixel regions for that mask pixel that are covered region is at least equal to a region threshold. The electronics can classify a mask pixel as an uncovered pixel when the number covered regions for that mask pixel below the region threshold. A suitable region threshold includes, but is not limited to, 1.

Application of the one or more secondary coverage criteria is optional. For instance, when the mask pixels include a single pixel region, application of the one or more secondary coverage criteria need not be employed. For instance, the covered regions will be classified as covered pixels for screening and the uncovered regions will be classified as uncovered pixels for the purposes of screening. Additionally, application of the one or more secondary coverage criteria can be combined with application of the one or more criteria. For instance, the electronics can identify covered regions for a mask pixel until the number of covered regions rises to the region threshold. Once the number of covered regions meets to the region threshold, the mask pixel is classified as a covered pixel and if the total number of covered regions for the mask pixel falls below the region threshold, the mask pixel is classified as an uncovered pixel.

The coverage criteria and the secondary coverage criteria result in at least a threshold portion of each covered pixels being covered by the shape. For instance, the coverage criteria and the secondary coverage can ensure that at least a threshold number of pixel regions are covered regions for a mask pixel to be a covered pixel or that at least a coverage threshold percentage of the pixel regions are covered in order for the mask pixel to be a covered pixel. The coverage criteria and the secondary coverage criteria can also ensure that uncovered pixels are not covered by the shape. Additionally, the coverage criteria and the secondary coverage criteria can ensure that less than the threshold portion of each uncovered pixels is covered by the shape.

The electronics employ the pixel mask to screen the primitive pixels for additional processing. For instance, the electronics consider each of the primitive pixels that corresponds to a mask pixel for further processing. Each primitive pixel that corresponds to a mask pixel is compared to the corresponding mask pixel. When the corresponding mask pixel is an uncovered pixel, the primitive pixel will not represent a portion of the shape on the screen and is accordingly a discarded pixel that is not processed further. When the corresponding mask pixel is a covered pixel, the primitive pixel may represent a portion of the shape on the screen and is accordingly a retained pixel that is processed further. In some instances, whether a retained pixel represents a portion of a shape on the screen is a result of the subsequent processing of the retained pixel.

Examples of further processing of retained pixels include determination of pixel attributes. Each retained pixel can be associated with a set of pixel attributes. Examples of pixel attributes include color values and texture coordinates. For instance, retained pixels can each be associated with color values R, G, and B and/or with texture coordinates such as s and t. Suitable methods for generating the pixel attributes include interpolation between the vertices of the bounds primitive. For instance, texture coordinates and color values can be interpolated between the vertices of the bounds primitive. Each of the bounds primitive vertices can be associated with a set of vertex attributes such as R, G, B, s, t. The pixel attributes can be generated by interpolating between the vertices. In some instances, interpolation includes interpolating spatial gradients of the texture coordinates. An example of a spatial gradient of a texture coordinate is the partial derivative ds/dx where ds is the change in the texture coordinate per and dx is a move in the x direction in pixel coordinates. Accordingly, these gradients reflect the rate of change of texture coordinates relative to pixel coordinates. Suitable interpolation techniques include, but are not limited to, spherical linear interpolation, bi-linear interpolation, tri-linear interpolation, nearest neighbor interpolation, and Phong interpolation.

In some instances, the electronics perform set-up processing before performing the interpolation and before performing the screening and/or before performing the interpolation and after performing the screening. During the set-up processing, the electronics can generate parameters for the subsequent interpolation of attributes such as color and/or texture. For instance, the electronics can generate coefficients of equations used for the interpolation. In some instances, electronics generate the spatial gradients of the texture coordinates during the set-up processing.

In some instances, additional processing that can be performed on a retained pixel includes texture mapping. The spatial gradients of texture coordinates can be employed in the texture mapping. For instance, each texture can be associated with a plurality of MIP (multum in parvo) maps that each has a different resolution of textels. The spatial gradients of texture coordinates can be used to identify the MIP map that is correct for a particular primitive pixel or for a particular collection of primitive pixels.

Additional processing that can be performed on a retained pixel can also include blending. The blending can include anti-aliasing. After blending, the electronics can render the image on the display screen.

In some instances, the electronics process a portion of the data in hardware and process another portion of the data using software and/or firmware. For instance, the electronics can employ software and/or firmware to convert the shape description to screen coordinates, to generate the pixel mask, and to generate the bounds primitive while employing hardware to rasterize the bounds primitive, to perform set-up processing, to perform the pixel screening and to perform interpolation. In one example, the electronics employ software and/or firmware to generate the pixel masks while employing hardware to rasterize the bounds primitive and screen the primitive pixels.

When the pixel mask is generated using software and/or firmware and the primitive pixels are screened using hardware, the pixel coverage data can be generated using the hardware or using the software and/or firmware. For instance, the software and/or firmware can be used to consider the pixels regions to identify covered and uncovered pixels and can send the hardware a bit associated with each pixel. The bit can indicate whether the pixel is a covered pixel or an uncovered pixel. The hardware can then consider the bit in screening the primitive pixels. Alternately, the software and/or firmware can be used to send the hardware a single bit associated with each of the pixel regions for a mask pixel. The bit can indicate whether the pixel region is a covered region or an uncovered region. The hardware can consider the bit for one or more of the pixel regions to determine whether the mask pixel is a covered pixel or an uncovered pixels. Alternately, the software and/or firmware can be used to count the number of covered pixel regions for a mask pixel and can send the hardware bits that indicate the number of covered regions for the mask pixel. The hardware can employ the bits to determine whether the mask pixel is a covered pixel or an uncovered pixel. Alternately, the software and/or firmware can be used to count the number of uncovered pixel regions for a mask pixel and can send the hardware bits that indicate the number of uncovered regions for the mask pixel. The hardware can employ the bits to determine whether the mask pixel is a covered pixel or an uncovered pixel. Sending the number of covered regions or uncovered regions to the hardware can increase the efficiency of the data transfer to the hardware by reducing the number of bits that must be sent to the hardware. For instance, the number of covered regions can be indicated by n bits where $2^n$ is the number of pixel regions in a mask pixel. As a result, when the number of covered regions are sent to the hardware, only n bits need to be sent to the hardware rather than $2^n$.

The software and/or the firmware can be configured to transfer blocks of data to the hardware. In many instances, the amount of data in a block exceeds the amount of data associated with a single mask pixel. Accordingly, sending the hardware data for single pixels can result in an inefficient transfer of data to the hardware. As a result, the pixel mask can be divided into tiles. Each tile includes a plurality of the mask pixels and has the same diensions (n pixels by m pixels). The tiles sizes can be defined such that the data for each tile can be transferred to the hardware in one of the blocks. As a result, the tiles permit efficient transfer of data to the hardware.

When the pixel mask is generated using software and/or firmware and the primitive pixels are screened using hardware, the data for the mask pixels is sent to the hardware in the same sequence that the hardware screens the primitive pixels. As a result, the sequence of data transfer to the hardware assures that the hardware is screening a primitive pixels the hardware is employing data for the corresponding mask pixel. When the pixel mask is divided into tiles, the tile dimensions can be selected so transfer of data for the tile to the hardware results in the hardware receiving the data for the pixel masks in the correct sequence.

When the pixel mask is generated using software and/or firmware and the primitive pixels are screened using hardware, the software can provide the attributes for the vertices of the bounds primitive to the hardware along with the locations of the vertices. Software can also be employed to determine the attributes at the vertices. For instance, the attributes can be generated by the interfaced software application through an Application Programming Interface (API) such as an OpenGL API. Alternately, the attributes can be generated by a programmable shader which can set the texture position, color and attribute information using coefficients to a globally specified function. The attributes would be computed as part of the process of transforming the shape description to screen coordinates.

Figure 3:
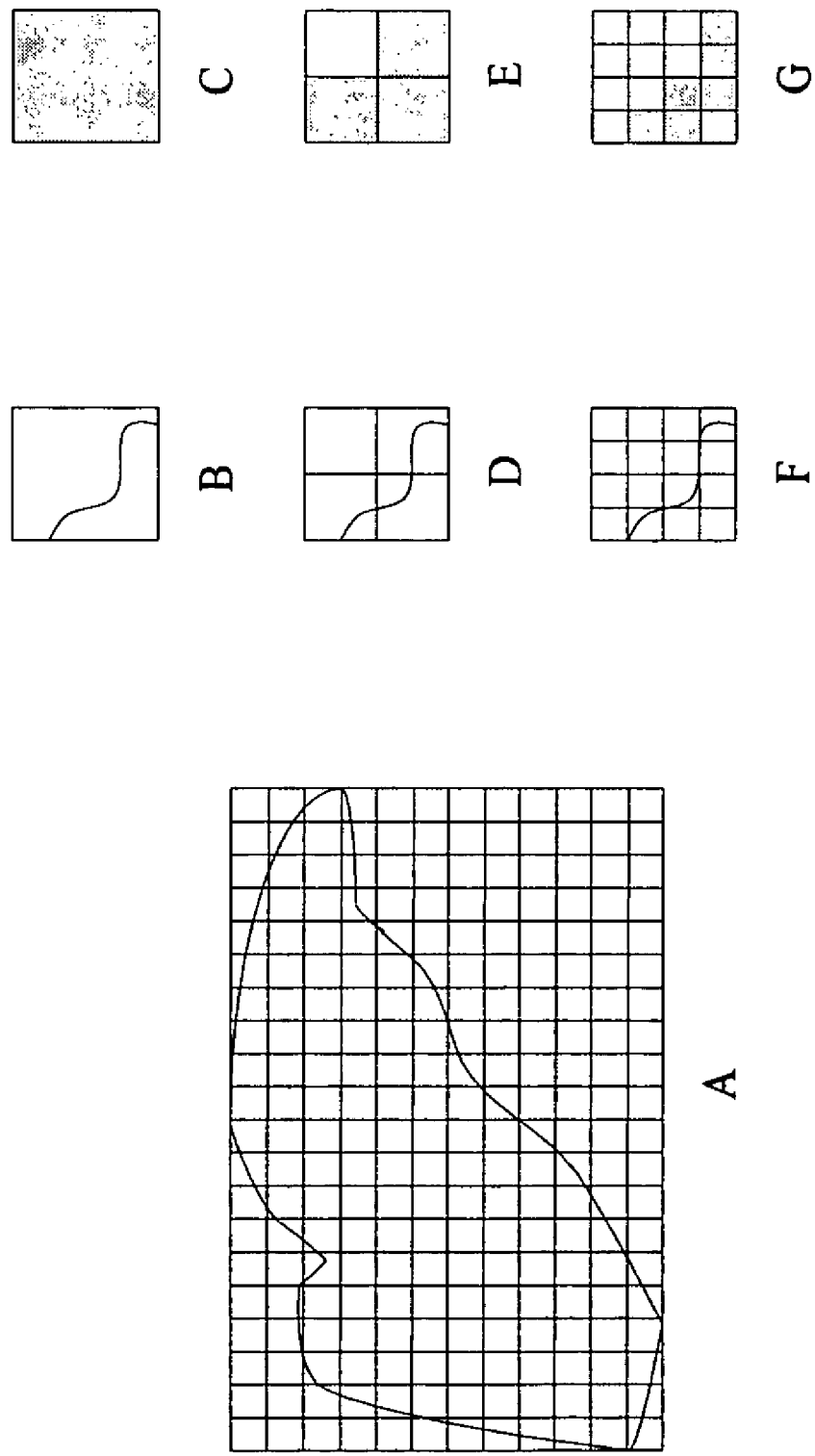
FIG. 3 illustrates generation of a pixel mask from a screen shape. The pixel mask was generated by rasterizing the screen shape into mask pixels such that each mask pixel is divided into more than one pixel region.

The electronics can approximate the portion of a mask pixel covered by the screen shape by dividing each pixel into a plurality of pixel regions. For instances, the electronics can determine the fractional coverage of mask pixels or can determine one or more parameters that indicate the fractional coverage of each mask pixel. FIG. 3 illustrates the screen shape from FIG. 2 rasterized such that each mask pixel is divided into four pixel regions. The diagram labeled B in FIG. 3 illustrates a single mask pixel. The diagram labeled D illustrates the mask pixel of diagram B divided into four pixel regions. The diagram labeled F in FIG. 3 illustrates the mask pixel of diagram B divided into sixteen pixel regions. Each pixel region has the same shape and size. A portion of a shape is shown covering the pixel illustrated in diagram B, diagram B, and diagram F. As noted above, each pixel region can be acovered region or an uncovered region. The electronics can count the number of covered regions associated with a particular mask pixel. The number of pixel regions that are covered regions indicates the fractional coverage of the mask pixel when the total number of pixel regions per mask pixel are known. For instance, the number of mask regions that are covered pixels are the numerator in the fractional coverage while the total number of mask regions per mask pixel serves as the denominator.

The data indicating the fractional coverage can be employed for anti-aliasing. For instance, the fractional coverage can be employed in blending operations such as Porter Duff blending.

When the pixel mask is generated using software and/or firmware and the primitive pixels are screened using hardware, the software and/or firmware can be used to determine the data indicating the fractional coverage and the data can be transferred to the hardware. For instance, as noted above, the software and/or firmware can be used to count the number of covered pixel regions for a mask pixel and can send the hardware bits that indicate the number of covered regions for the mask pixel. The hardware can employ the bits to determine whether the mask pixel is a covered pixel or an uncovered pixel. Alternately, the software and/or firmware can be used to count the number of uncovered pixel regions for a mask pixel and can send the hardware bits that indicate the number of uncovered regions for the mask pixel. Alternately, the hardware can be used to determine the data indicating the fractional coverage. For instance, as noted above, the software and/or firmware can be used to send the hardware a single bit associated with each of the pixel regions for a mask pixel. The bit can indicate whether the pixel region is a covered region or an uncovered region. The hardware can then count the number of pixel regions that are covered regions.

Figure 4:
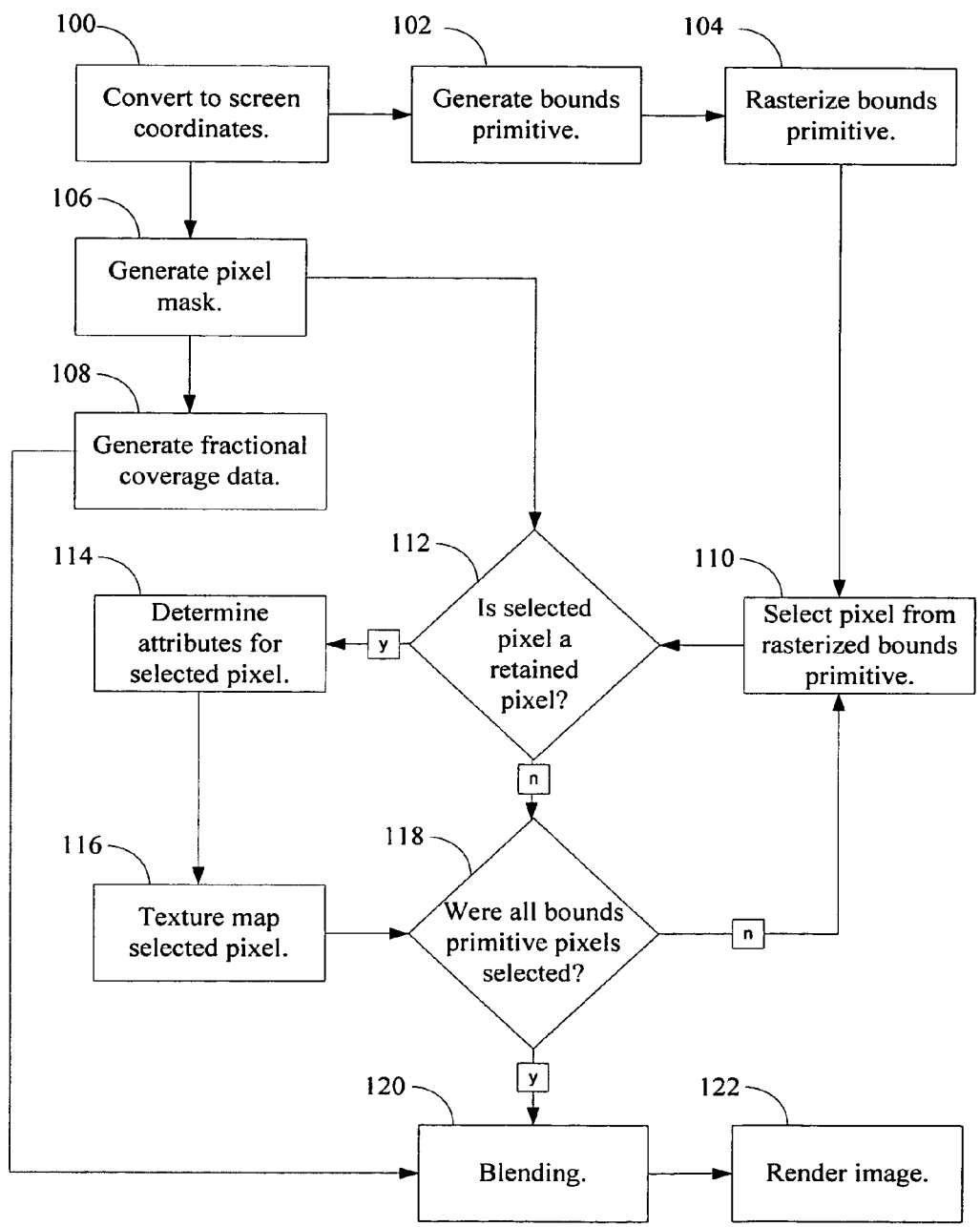
FIG. 4 illustrates a method of operating a graphics system.

FIG. 4 illustrates a method of operating the graphics system. At process block 100, the electronics convert the shape description to screen coordinates. Accordingly, the electronics convert the shape described in the shape description to the screen shape. At process block 102, the electronics employ the screen shape to generate a bounds primitive. The bounds primitive bounds the screen shape. At process block 104, the electronics rasterize the bounds primitive into primitive pixels such that each primitive pixel corresponds to a pixel on the screen.

At process block 106, the electronics employ the screen shape to generate a pixel mask. Generating the pixel mask includes rasterizing the screen shape into mask pixels such that each mask pixel is divided into one or more pixel regions. Generating the pixel mask can include generating pixel coverage data which identifies covered regions and uncovered regions. At process block 108, the electronics can optionally generate one or more parameters that indicate the fractional coverage of the mask pixels.

At process block 110, the electronics select a primitive pixel. At determination block 112, a determination is made whether the selected primitive pixel is a discarded pixel or a retained pixel. When the selected pixel corresponds to a mask pixel that is a covered pixel, the selected pixel is a retained pixel. When the corresponding mask pixel is an uncovered pixel, the selected pixel is a discarded pixel. Accordingly, the electronics access data from process block 106 when executing determination block 112.

When the electronics determine that the selected pixel is a retained pixel, the electronics determine attributes for the selected pixel at process block 114. The pixel attributes can include color and texture for the retained pixel. For instance, the electronics can interpolate the color and texture attributes for the selected pixel between the color and texture attributes between the color and texture attributes for vertices of the bounds primitive. At process block 116, the electronics can perform texture mapping for the retained pixel.

The electronics proceed from process block 116 to determination block 118. Additionally, the electronics proceed to determination block 118 when the electronics determine that the selected pixel is a discarded pixel at process block 112. At determination block 118, the electronics make a determination whether each of the primitive pixels has been selected. When the determination is negative, the electronics return to process block 110. When the determination is positive, the electronics perform blending at process block 120. Blending can include employing the parameters that indicate fractional coverage to perform anti-aliasing. For instance, the parameters that indicate fractional coverage can be employed in Porter Duff blending. Accordingly, the electronics can access data from process block 108 when executing process block 120. The image is rendered on the screen at process block 122.

Figure 5:
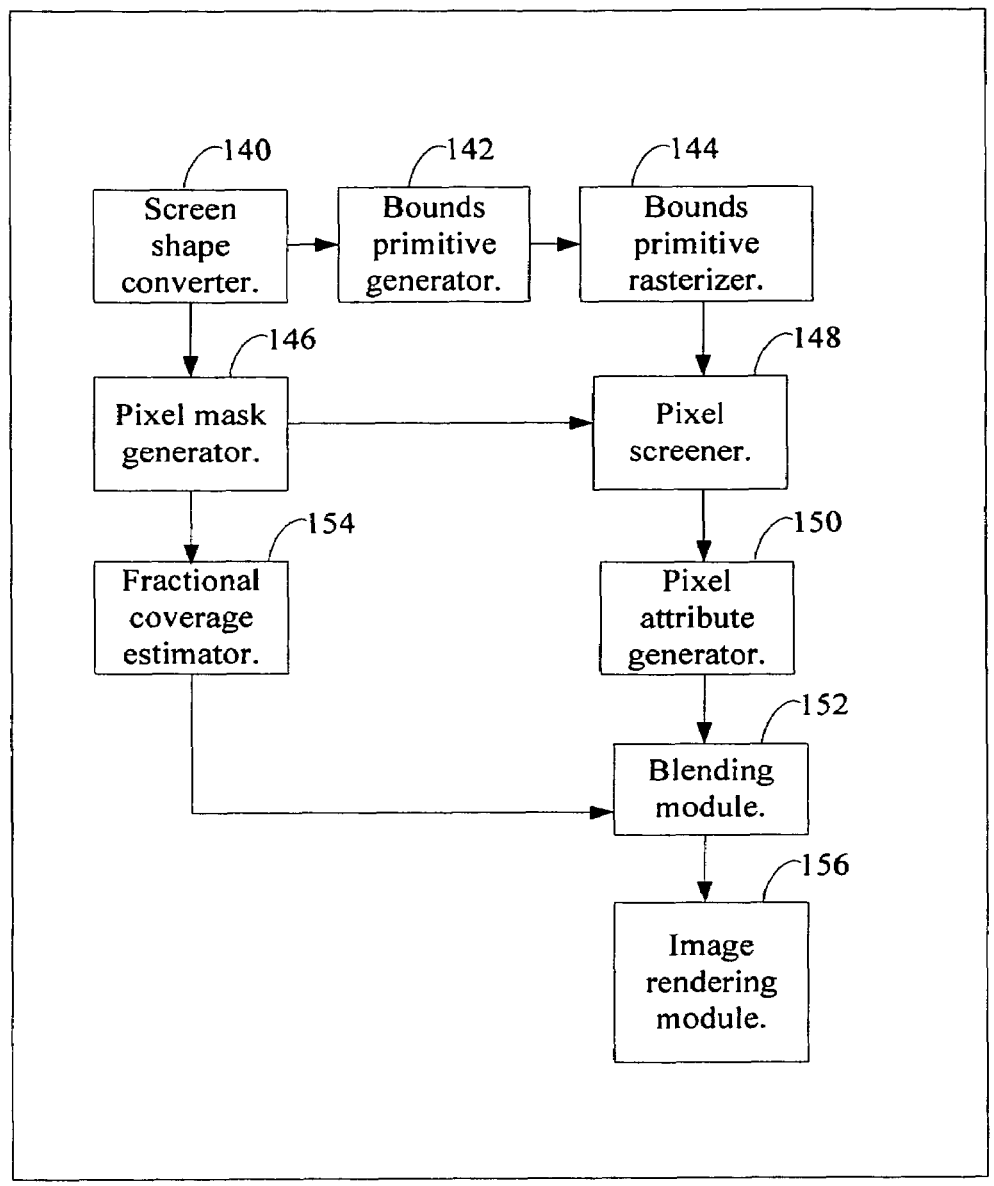
FIG. 5 is a logic flow diagram showing logic modules for operating a graphics system.

FIG. 5 is a logic flow diagram showing logic modules for operating a graphics system. The electronics include a screen shape converter 140 for converting the shape description to screen coordinates. The shape description converted to screen coordinates serves as the screen shape. The electronics also include a bounds primitive generator 142 for generating the bounds primitive from the screen shape. The electronics also include a bounds primitive rasterizer 144 for rasterizing the bounds primitive into primitive pixels.

The electronics include a pixel mask generator 146 for generating a pixel mask from the screen coordinates. The pixel mask is rasterized into mask pixels such that each mask pixel includes one or more pixel regions. The pixel mask can also identify which mask pixels are covered pixels and which pixels are uncovered pixels. Each primitive pixel corresponds to a mask pixel.

The electronics include a pixel screener 148 configured to screen the primitive pixels for retained pixels and discarded pixels. When a primitive pixel corresponds to a mask pixel that is a covered pixel, the primitive pixel is a retained pixel. When the corresponding mask pixel is an uncovered pixel, the primitive pixel is a discarded pixel.

The electronics include a pixel attribute generator 150 that generates attributes for the retained pixels. The pixel attributes can include the color and texture for the retained pixels.

The electronics include a blending module 152 that can be configured to provide anti-aliasing of the image. The blending module can optionally employ fractional coverage data for the retained pixels. Accordingly, the electronics can optionally include a fractional coverage estimator 154 configured to estimate the fractional coverage of the retained pixels. The electronics include an image rendering module 156 for rending the image on the screen.

The electronics can include modules in addition to the illustrated modules. For instance, the electronics can include a z-buffer module. The z-buffer module can ensure that overlapping shapes in the image overlap correctly. For instance, the z-buffer module can ensure that the shape closest to the front of the image is the image that is actually viewed on the screen. The z-buffer module is most useful when the shape description is three dimensional and may not be required when the shape description is two-dimensional.

Although the disclosures are in the context of a destination that is a two-dimensional display screen, the principles of the invention can be applied to destinations with higher orders of dimensionality. For instance, the principles of the invention can be applied to three-dimensional modeling technologies.

All or a portion of one or more methods described above can be executed by the graphics system and/or by the electronics in the graphics system. Further, the controller can cause the electronics and/or the graphics system to execute all or a portion of one or more of the above methods. When the electronics include a computer-readable medium, the controller can execute the instructions on the computer-readable medium. The instructions can cause the controller to execute all or the portion of one or more methods disclosed above. Additionally, all or a portion of one or more of the above methods can be executed by systems and devices other than the graphics system.

Those of skill in the art would understand that information and signals may be represented using any of a variety of different technologies and techniques. For example, data and instructions that may be referenced throughout the above description may be represented by voltages, currents, electromagnetic waves, magnetic fields or particles, optical fields or particles, or any combination thereof.

Those of skill would further appreciate that the various illustrative logical blocks, circuits, and method steps described in connection with the embodiments disclosed herein may be implemented as electronic hardware, computer software, or combinations of both. To clearly illustrate this interchangeability of hardware and software, various illustrative components, blocks, logic, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, logic, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. An exemplary storage computer-readable medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a screen shape converter configured to convert a shape description into screen coordinates defining a screen shape;
    a bounds primitive generator configured to generate a bounds primitive from the screen shape wherein the bounds primitive bounds the screen shape;
    a bounds primitive rasterizer configured to rasterize the bounds primitive into a plurality of primitive pixels wherein each primitive pixel corresponds to a screen pixel;
    a pixel mask generator configured to rasterize the screen shape into a plurality of mask pixels wherein each mask pixel is divided into one or more pixel regions, each mask pixel corresponds to one of the primitive pixels, each pixel region is classified as a covered region or an uncovered region according to a coverage criterion, and each mask pixel is classified as a covered mask pixel or uncovered mask pixel according to a secondary coverage criterion; and
    a pixel screener configured to retain primitive pixels that correspond to covered mask pixels and to discard primitive pixels that correspond to uncovered mask pixels.

2. The apparatus of claim 1, further comprising:
    an attribute generator configured to generate pixel attributes for the retained primitive pixels and being configured not to generate pixel attributes for the discarded primitive pixels.

3. The apparatus of claim 2, wherein the pixel attributes are generated by interpolating between attributes associated with vertices of the bounds primitive.

4. The apparatus of claim 2, wherein the pixel attributes include color values.

5. The apparatus of claim 1, wherein the pixel screener is implemented by hardware and the pixel mask generator is implemented by a processor executing instructions on a computer-readable medium.

6. The apparatus of claim 5, wherein the bounds primitive rasterizer is implemented in hardware.

7. The apparatus of claim 1, further comprising:
    a fractional coverage estimator configured to generate one or more variables that indicate fractional coverage of the mask pixels, the fractional coverage being the portion of a mask pixel that is covered by the shape.

8. The apparatus of claim 7, wherein
    the pixel mask generator classifies the pixel region as a covered region when a portion of the screen shape falls inside of the pixel region and classifies the pixel region as an uncovered region when the screen shape falls entirely outside of the pixel region.

9. The apparatus of claim 8, wherein generating the one or more variables that indicate fractional coverage of a mask pixel includes determining the number pixel regions in the mask pixel that are covered regions.

10. The apparatus of claim 9, further comprising:
    a blending module configured to employ the one or more variables that indicate fractional coverage in anti-aliasing the shape.

11. The apparatus of claim 7, wherein the pixel mask generator classifies the pixel region as a covered region when the screen shape covers more than a threshold percentage of the pixel region and classifies the pixel region as an uncovered region when the screen shape covers less than a threshold percentage of the pixel region.

12. The apparatus of claim 11, wherein generating the one or more variables that indicate fractional coverage of a mask pixel includes determining the number pixel regions in the mask pixel that are covered regions.

13. The apparatus of claim 12, further comprising:
    a blending module configured to employ the one or more variables that indicate fractional coverage in anti-aliasing the shape.

14. The apparatus of claim 7, wherein the pixel mask generator classifies a mask pixel as covered when the number of pixel regions for the mask pixel that are covered regions is greater than or equal to a region threshold, wherein the region threshold is greater than or equal to one.

15. A method of operating a graphics system, the method being executed by a computer or processor, comprising:
    converting a shape description into screen coordinates defining a screen shape;

generating a bounds primitive from the screen shape wherein the bounds primitive bounds the screen shape;

rasterizing the bounds primitive into a plurality of primitive pixels wherein each primitive pixel corresponds to a screen pixel;

rasterizing the screen shape into a plurality of mask pixels wherein each mask pixel is divided into one or more pixel regions, each mask pixel corresponds to one of the primitive pixels, each pixel region is classified as a covered region or an uncovered region according to a coverage criterion, and each mask pixel is classified as a covered mask pixel or uncovered mask pixel according to a secondary coverage criterion; and screening the primitive pixels by retaining primitive pixels that correspond to covered mask pixels and discarding primitive pixels that correspond to uncovered mask pixels.

16. The method of claim 15, further comprising:

generating pixel attributes for the retained primitive pixels and refraining from generating pixel attributes for the discarded primitive pixels.

17. The method of claim 16, wherein the pixel attributes are generated by interpolating between attributes associated with vertices of the bounds primitive.

18. The method of claim 17, wherein the pixel attributes include color values.

19. The method of claim 15, wherein the bounds primitive is rasterized in hardware, the pixel mask is generated by a processor executing instruction on a computer-readable medium, and the primitive pixel are screened in hardware.

20. The method of claim 15, further comprising:

generating one or more variables that indicate fractional coverage of the mask pixels, the fractional coverage being the portion of a mask pixel that is covered by the shape.

21. The method of claim 20, wherein the pixel region is classified as a covered region when a portion of the screen shape falls inside of the pixel region and the pixel region is classified as an uncovered region when the screen shape falls entirely outside of the pixel region, and wherein generating the one or more variables that indicate fractional coverage of the mask pixels includes determining the number pixel regions in the mask pixel that are covered regions.

22. The method of claim 20, wherein the pixel region is classified as a covered region when the screen shape covers more than a threshold percentage of the pixel region and the pixel region is classified as an uncovered region when the screen shape covers less than a threshold percentage of the pixel region, and wherein generating the one or more variables that indicate fractional coverage of the mask pixels includes determining the number pixel regions in the mask pixel that are covered regions.

23. A computer-readable medium having a set of computer-executable instructions, the set of instructions comprising:

converting a shape description into screen coordinates defining a screen shape;

generating a bounds primitive from the screen shape wherein the bounds primitive bounds the screen shape;

rasterizing the bounds primitive into a plurality of primitive pixels wherein each primitive pixel corresponds to a screen pixel;

rasterizing the screen shape into a plurality of mask pixels wherein each mask pixel is divided into one or more pixel regions, each mask pixel corresponds to one of the primitive pixels, each pixel region is classified as a covered region or an uncovered region according to a coverage criterion, and each mask pixel is classified as a covered mask pixel or uncovered mask pixel according to a secondary coverage criterion; and screening the primitive pixels by retaining primitive pixels that correspond to covered mask pixels and discarding primitive pixels that correspond to uncovered mask pixels.

24. An apparatus comprising:

means for converting a shape description into screen coordinates defining a screen shape;

means for generating a bounds primitive from the screen shape wherein the bounds primitive bounds the screen shape;

means for rasterizing the bounds primitive into a plurality of primitive pixels wherein each primitive pixel corresponds to a screen pixel;

means for rasterizing the screen shape into a plurality of mask pixels wherein each mask pixel is divided into one or more pixel regions, each mask pixel corresponds to one of the primitive pixels, each pixel region is classified as a covered region or an uncovered region according to a coverage criterion, and each mask pixel is classified as a covered mask pixel or uncovered mask pixel according to a secondary coverage criterion; and means for screening the primitive pixels by retaining primitive pixels that correspond to covered mask pixels and discarding primitive pixels that correspond to uncovered mask pixels.

25. The apparatus of claim 24, further comprising:

means for generating pixel attributes for the retained primitive pixels and refraining from generating pixel attributes for the discarded primitive pixels.

26. The apparatus of claim 25, wherein the pixel attributes are generated by interpolating between attributes associated with vertices of the bounds primitive.

27. The apparatus of claim 24, wherein the means for generating the pixel mask is hardware, the means for generating a pixel mask is a processor executing instructions on a computer-readable medium, and the means for generating the pixel mask is hardware.

28. The apparatus of claim 24, further comprising:

means for generating one or more variables that indicate fractional coverage of the mask pixels, the fractional coverage being the portion of a mask pixel that is covered by the shape.

* * * * *